US011347539B2

(12) United States Patent
Horsnell et al.

(10) Patent No.: US 11,347,539 B2
(45) Date of Patent: May 31, 2022

(54) CHECKING LOCK VARIABLES FOR TRANSACTIONS IN A SYSTEM WITH TRANSACTIONAL MEMORY SUPPORT

(71) Applicant: ARM Limited, Cherry Hinton (GB)

(72) Inventors: Matthew James Horsnell, Cambridge (GB); Stephan Diestelhorst, Cambridge (GB)

(73) Assignee: Arm Limited, Cambridge (GB)

( * ) Notice: Subject to any disclaimer, the term of this patent is extended or adjusted under 35 U.S.C. 154(b) by 134 days.

(21) Appl. No.: 16/651,178

(22) PCT Filed: Aug. 30, 2018

(86) PCT No.: PCT/GB2018/052452
§ 371 (c)(1),
(2) Date: Mar. 26, 2020

(87) PCT Pub. No.: WO2019/073192
PCT Pub. Date: Apr. 18, 2019

(65) Prior Publication Data
US 2020/0272505 A1    Aug. 27, 2020

(30) Foreign Application Priority Data
Oct. 10, 2017    (GB) ..................................... 1716568

(51) Int. Cl.
*G06F 9/46*        (2006.01)
*G06F 9/30*        (2018.01)
(Continued)

(52) U.S. Cl.
CPC ............ *G06F 9/467* (2013.01); *G06F 9/3009* (2013.01); *G06F 9/30043* (2013.01);
(Continued)

(58) Field of Classification Search
CPC .. G06F 9/467; G06F 9/30043; G06F 9/30087; G06F 9/3009; G06F 9/30145;
(Continued)

(56) References Cited

U.S. PATENT DOCUMENTS

| 2005/0251664 A1* | 11/2005 | Caprioli | ................ | G06F 9/3842 |
| | | | | 712/228 |
| 2008/0162885 A1* | 7/2008 | Wang | ..................... | G06F 9/3842 |
| | | | | 712/214 |

(Continued)

FOREIGN PATENT DOCUMENTS

GB              2523804              9/2015

OTHER PUBLICATIONS

International Search Report and Written Opinion of the ISA for PCT/GB2018/052452, dated Dec. 7, 2018, 16 pages.
Combined Search and Examination Report for GB1716568.9, dated Apr. 4, 2018, 7 pages.
Bedichek, "Some Efficient Architecture Simulation Techniques", Department of Computer Science, FR-35, University of Washington, Winter 1990 USENIX Conference, 12 pages.

*Primary Examiner* — Cheng Yuan Tseng
(74) *Attorney, Agent, or Firm* — Nixon & Vanderhye P.C.

(57) ABSTRACT

In an apparatus (2) with transactional memory support, a predetermined type of transaction start instruction or a subsequent instruction following the predetermined type of transaction start instruction triggers capture of a lock identifier which identifies a lock variable for controlling exclusive access to at least one resource. In response to a predetermined type of transaction end instruction which follows the predetermined type of transaction start instruction, the lock variable is checked and commitment of results of speculatively executed instructions of the transaction is prevented or deferred when the lock variable indicates that another thread holds the exclusive access to the target resource. This approach can improve performance when executing transactions in a transactional memory based system.

20 Claims, 9 Drawing Sheets

(51) Int. Cl.
*G06F 9/38* (2018.01)
*G06F 9/52* (2006.01)

(52) U.S. Cl.
CPC ...... *G06F 9/30087* (2013.01); *G06F 9/30145* (2013.01); *G06F 9/3842* (2013.01); *G06F 9/528* (2013.01)

(58) Field of Classification Search
CPC .......... G06F 9/3842; G06F 9/528; G06F 9/52; G06F 9/522; G06F 9/524; G06F 9/526; G06F 9/3016; G06F 9/3844; G06F 9/3846; G06F 9/3848; G06F 9/3838; G06F 9/466; G06F 8/458; G06F 8/433
USPC .................. 712/213, 216–219, 245; 717/153
See application file for complete search history.

(56) References Cited

U.S. PATENT DOCUMENTS

| | | |
|---|---|---|
| 2008/0189531 A1* | 8/2008 | Chaudhry ............. G06F 9/3851 712/227 |
| 2008/0256074 A1 | 10/2008 | Lev et al. |
| 2010/0023706 A1 | 1/2010 | Christie et al. |
| 2013/0173869 A1 | 7/2013 | Saha et al. |
| 2015/0134896 A1 | 5/2015 | Adl-Tabatabai et al. |
| 2015/0261531 A1 | 9/2015 | Greiner et al. |
| 2015/0277967 A1 | 10/2015 | Calciu et al. |
| 2016/0011915 A1 | 1/2016 | Dice et al. |
| 2016/0371128 A1 | 12/2016 | Michael et al. |
| 2017/0060579 A1* | 3/2017 | Vincent ................. G06F 9/3871 |

* cited by examiner

CHECKING LOCK VARIABLES FOR TRANSACTIONS IN A SYSTEM WITH TRANSACTIONAL MEMORY SUPPORT

This application is the U.S. national phase of International Application No. PCT/GB2018/052452 filed 30 Aug. 2018, which designated the U.S. and claims priority to GB Patent Application No. 1716568.9 filed 10 Oct. 2017, the entire contents of each of which are hereby incorporated by reference.

The present technique relates to the field of data processing. More particularly, it relates to transactional memory.

A data processing system may execute a number of threads of data processing. Sometimes, the threads may need to access a shared resource and the nature of the data processing operations may be such that once a thread starts interacting with the shared resource, it may be necessary for a set of operations to complete atomically using the resource without another thread accessing the resource in the meantime.

One technique for handling this conflict between threads may be to use locks to control exclusive access to at least one target resource. For example, when one thread starts accessing data in a particular address region, the thread may set a lock variable to claim ownership of the lock, and then while the lock owning thread has ownership of the lock, other threads checking the lock variable may determine that the lock is already claimed and so may not enter the section of code which interacts with that address region. Such a lock-based approach can be seen as pessimistic in that each thread by default assumes that it cannot enter the section of code which access the shared resource because a conflict with another thread may occur, unless it has ownership of the lock guaranteeing that no conflict can occur. However, often a lock identifier may control exclusive access to a number of resources (e.g. a range of addresses), and so it is not guaranteed that if one thread is accessing certain resources within the set of resources protected by the lock variable, another thread will definitely access the same resource. Hence, a lock-based approach may, in cases where conflicts between threads are rare, lead to a loss of performance because threads may unnecessarily be waiting for the locks to be released before entering the critical section of code which uses the shared resource.

A more optimistic approach for handling conflicts between threads accessing shared resources can be to use transactional memory support. A data processing system may have circuitry to support execution of a transaction within a thread of data processing by the processing circuitry. The transaction may be those instructions of the thread which are executed between a transaction start instruction marking the beginning of the transaction and a transaction end instruction marking the end of the transaction. Between the transaction start and end instructions, the processing circuitry may speculatively execute the intervening instructions and prevent commitment of the results of those speculatively executed instructions until the transaction end instruction is reached. Occurrence of an abort event following execution of the transaction start instruction (but before the transaction end instruction is reached) may result in the transaction being aborted and the speculative results being discarded. There may be a number of reasons for aborting a transaction, but one reason may be a detected conflict with a memory access made by another thread. Hence, with this approach each thread may optimistically start processing the critical section of code assuming that no conflicts with other threads will occur, and then if the end of the critical section is reached without any conflict being detected the results of the transaction can be committed. In cases where conflict is rare, using transactional memory support can improve performance by allowing more threads to concurrently process their critical sections of code.

At least some examples provide an apparatus comprising: an instruction decoder to decode instructions; and processing circuitry to perform data processing in response to the instructions decoded by the instruction decoder, the processing circuitry comprising transactional memory support circuitry to support execution of a transaction within a thread of data processing by the processing circuitry, the transaction comprising instructions of the thread executed speculatively between a transaction start instruction and a transaction end instruction, for which the processing circuitry is configured to prevent commitment of results of the speculatively executed instructions until the transaction end instruction is reached; wherein in response to a predetermined type of transaction start instruction of a given thread or a subsequent instruction following said predetermined type of transaction start instruction in said given thread, the instruction decoder is configured to control the processing circuitry to capture a lock identifier identifying a lock variable for controlling exclusive access to at least one target resource; and in response to a predetermined type of transaction end instruction of the given thread executed following said predetermined type of transaction start instruction, the instruction decoder is configured to control the processing circuitry to check the lock variable identified by the captured lock identifier, and to prevent or defer commitment of the results of the speculatively executed instructions for the given thread when the lock variable indicates that another thread holds exclusive access to said at least one target resource.

At least some examples provide a data processing method comprising:

performing data processing in response to decoded instructions using processing circuitry comprising transactional memory support circuitry to support execution of a transaction within a thread of data processing by the processing circuitry, the transaction comprising instructions of the thread executed speculatively between a transaction start instruction and a transaction end instruction, for which the processing circuitry is configured to prevent commitment of results of the speculatively executed instructions until the transaction end instruction is reached; in response to decoding of a predetermined type of transaction start instruction of a given thread or a subsequent instruction following said predetermined type of transaction start instruction in said given thread, capturing a lock identifier identifying a lock variable for controlling exclusive access to at least one target resource; and in response to decoding of a predetermined type of transaction end instruction of the given thread executed following said predetermined type of transaction start instruction, checking the lock variable identified by the captured lock identifier, and preventing or deferring commitment of the results of the speculatively executed instructions for the given thread when the lock variable indicates that another thread holds exclusive access to said at least one target resource.

At least some examples provide a computer program for controlling a host data processing apparatus to provide an instruction execution environment for execution of instructions, comprising: processing program logic supporting execution of a transaction within a thread of data processing, the transaction comprising instructions of the thread executed speculatively between a transaction start instruction and a transaction end instruction, for which the processing program logic is configured to prevent commitment of results of the speculatively executed instructions until the transaction end instruction is reached; wherein in response to a predetermined type of transaction start instruction of a given thread or a subsequent instruction following said predetermined type of transaction start instruction in said given thread, the processing program logic is configured to capture a lock identifier identifying a lock variable for controlling exclusive access to at least one target resource; and in response to a predetermined type of transaction end instruction of the given thread executed following said predetermined type of transaction start instruction, the processing program logic is configured to check the lock variable identified by the captured lock identifier, and to prevent or defer commitment of the results of the speculatively executed instructions for the given thread when the lock variable indicates that another thread holds exclusive access to said at least one target resource.

The computer program may be stored on a storage medium. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of data processing apparatus having transactional memory support circuitry;

Figure 1:
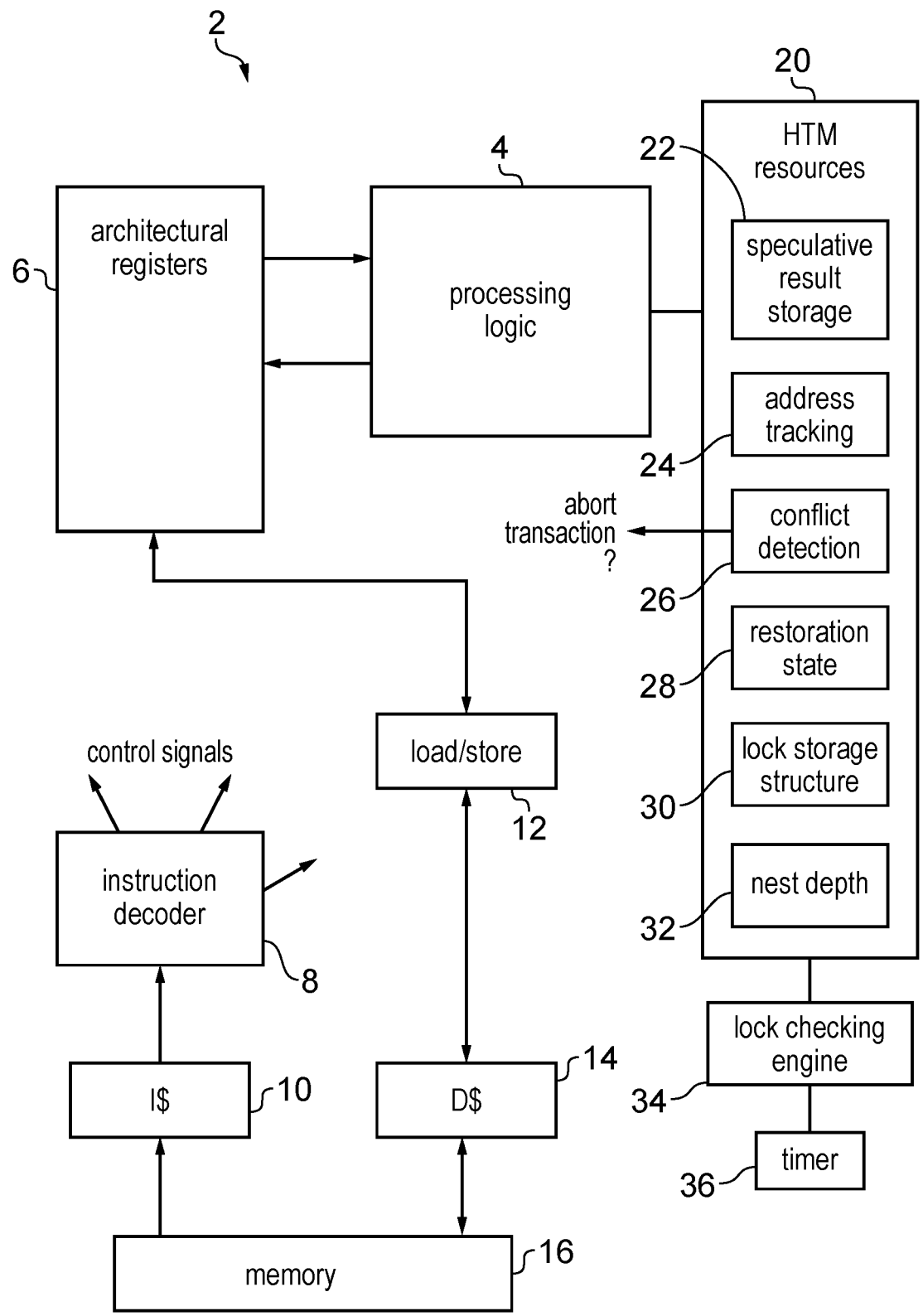

As the transactional memory support circuitry provides for speculative execution of instructions within a transaction so that the speculative results can be unwound if the transaction has to be aborted, it is not necessary to use a lock variable to avoid conflict between two threads executing transactions. However, there may also be some threads which are executing in a non-transaction-based approach. For example such non-transactional threads could be threads executing a section of code which was originally written or compiled without use of transactions (not comprising any transaction start and end instructions). Alternatively, the non-transactional threads may include threads which were previously processing instructions in a transaction-based mode, but for which the transaction encountered frequent abort events (e.g. due to conflict with other threads) and so processing has now been switched to a non-transaction-based mode. If such non-transactional threads need exclusive access to at least one target resource, then often a lock variable may still be used to control exclusive access to the at least one target resource. Counter intuitively, the transactional threads may still need to check the lock variable, because to ensure correct results for any non-transactional threads, a transactional thread should be prevented from committing a write to the shared resource while a non-transactional thread holds the lock. Therefore, often even within a transaction of a thread executed in a transactional mode, the transaction may still include instructions for checking the lock variable to determine whether any other thread holds exclusive access to at least one target resource, and deferring subsequent operations if the lock is currently held by another thread. This can lead to a delay in processing the instructions within a transaction.

However, the inventors recognised that as the instructions within a transaction execute speculatively, it is not in fact a problem to allow a transactional thread to continue with execution of the speculatively executed instructions within a transaction, even if a lock variable to be checked within the transaction indicates that another thread holds exclusive access to the at least one target resource. Such lock variable checking operations are not really for the protection of the transactional thread itself, since other mechanisms provided by the transactional memory support circuitry may abort the transaction if a conflict with another thread is detected. Instead, the lock variable checking is typically included in the transaction to protect a non-transactional thread against interference from a transactional thread. As the effects of the transactional thread would not be seen until results of the speculatively executed instructions are committed, this means it is safe to continue with speculative execution of the transaction up to the transaction end instruction, regardless of whether the lock variable indicates that another thread holds exclusive access to the locked resource. Instead, checking of the lock variable can be performed in response to a transaction end instruction. With this approach, there is no unnecessary delay of the start of the processing of the speculatively executed instructions when another thread holds the lock, and by the time the transaction reaches the transaction end instruction that other thread may already have released the lock. Hence, this approach can enable faster processing of transactions. This also improves performance for other transactions, because while a transaction in one thread is delayed it is holding resources within the transactional memory support circuitry which cannot be used for other transactions. Hence, enabling a transaction in one thread to be completed faster can also enable other threads to make use of the transactional memory resources earlier, improving overall performance.

Hence, in response to a predetermined type of transaction start instruction of a given thread or a subsequent instruction that follows that predetermined type of transaction start instruction in the given thread, an instruction decoder may control the processing circuitry to capture a lock identifier identifying a lock variable for controlling exclusive access to at least one target resource. In response to a predetermined type of transaction end instruction of a given thread which is executed following that predetermined type of transaction start instruction, the instruction decoder may control the processing circuitry to check the lock variable identified by the captured lock identifier, and to prevent or defer commitment of the results of the speculatively executed instructions for the given thread when the lock variable indicates that another thread holds exclusive access to the at least one target resource. Hence, rather than requiring explicit instructions within the transaction to check the lock variable and defer execution of subsequent instructions if the lock is set, the checking is performed by the processing circuitry in response to decoding of the transaction end instruction. By shifting the lock check to the end of the transaction, the operations within the transaction can be performed speculatively regardless of whether the lock has held, increasing the likelihood that the lock has already been released by the time the end of the transaction has been reached, and avoiding a delay at the start of the transaction.

The lock identifier can be any value which identifies the particular lock variable to be checked. However, in some examples the lock identifier may comprise an address of a storage location which stores the lock variable.

In some examples the instruction decoder may control the processing circuitry to capture the lock identifier in response to the predetermined type of transaction start instruction itself. In some cases the encoding of the predetermined type of transaction start instruction may actually specify the lock identifier (either directly as an immediate value or by specifying a register which stores the lock identifier). Hence, a programmer or compiler writing code can identify the lock variable to be checked by including that variable's lock identifier within the encoding of the transaction start instruction. Alternatively, the lock identifier could be read from a predetermined register which is read independently of the particular encoding of the transaction start instruction. For example a certain default register may be used to hold lock identifiers (e.g. addresses of lock variables) and this could be read in response to the predetermined type of transaction start instruction. Hence it is not essential for the encoding of the predetermined type of transaction start instruction to specify the lock identifier.

Alternatively, the capture of the lock identifier could be performed in response to a first instruction of a selected type which follows the predetermined type of transaction start instruction in the given thread, rather than in response to the predetermined type of transaction start instruction itself. In some cases the instruction of the selected type could be a special type of lock variable identifying instruction with a dedicated encoding. However, the instruction of the selected type could also be a type of instruction which provides other functionality in addition to identifying the lock identifier. For example, the instruction of the selected type could be a load instruction for loading a data value from a storage location into a register. In some cases the lock identifier may be determined to be the target address of the load instruction, which identifies the storage location from which the data value is to be loaded. Hence, with this approach when the first load instruction which follows the predetermined type of transaction start instruction encountered, the instruction decoder may control the processing circuitry to capture the target address of the first load instruction as the lock identifier. This approach can be useful because often existing code may check the lock variable as the very first instruction following the transaction start instruction, and often this is done by loading the lock variable into a register using a load instruction and then checking the value of the lock variable loaded into the register using a compare instruction. Hence, by capturing the lock identifier in response to the first load which follows the transaction start instruction, this may require less modification of existing code.

When the lock variable is checked in response to decoding of the predetermined type of transaction end instruction, and the lock variable indicates that another thread holds exclusive access to the at least one target resource, the processing circuitry may respond in a variety of ways to either prevent or defer commitment of the results of the speculatively executed instructions of the transaction. In one example the processing circuitry may simply abort the transaction if, at the time of the transaction end, the lock is held by another thread. This reduces complexity in providing heuristics for retrying the checking of the lock variable later.

Alternatively, in response to decoding of the predetermined type of transaction end instruction, commitment of the results of speculatively executed instructions of the transaction may be deferred until the locked variable indicates that the other thread has relinquished exclusive access to the at least one target resource. This approach can provide better forward progress since the speculative results may still be able to be committed, possibly with a delay while waiting for the lock to be relinquished by the other thread. However, if the transaction ends up waiting to long then it may be better to simply abort the transaction. Hence, if commitment of the results is initially deferred when another thread holds the lock, the processing circuitry may abort the transaction when a number of attempts to check the lock variable or a waiting latency associated with waiting for exclusive access to the at least one target resource to be relinquished by the other thread exceeds a predetermined threshold.

In some examples, the periodic checking of the lock variable in response to decoding of the predetermined type of transaction end instruction could be controlled by a lock checking engine which is separate from the normal processing path used to execute instructions. Hence, checking of the lock variable could occur in the background of other processing being performed by the processing logic. The lock checking engine could be invoked in response to the decoding of the predetermined type of transaction end instruction and may then handle the periodic checking of the lock variable and the determination of when sufficient attempts to check the lock variable or a sufficient time has passed that it is preferable to abort the transaction.

Sometimes a thread to be executed may involve nested transactions, where after executing a transaction start instruction for a first transaction, a further transaction start instruction is executed to represent the start of a second transaction nested within the first transaction, before the transaction end instruction of the first transaction is encountered. For example, this could be used for programs which allows multiple function entry or branch target locations within the code to which processing could branch into, where the person or the compiler preparing the code wishes to ensure that certain blocks of code are handled within a transaction regardless of whether processing has branched to a point before or after the very first transaction start instruction. While some hardware implementations could treat each nested transaction as a separate transaction, maintaining separate restoration state for each nested transaction and enabling partial unwinding to the transaction start instruction of an inner nested transaction, this may require relatively complex hardware resources which may not to be justified. Hence, other implementations may effectively ignore inner transactions, so that even if an abort occurs within an inner nested transaction, the state is rewound to the state which was pending at the time of the transaction start instruction associated with the outer transaction of the nested set of transactions. This means that only one set of restoration state would need to be maintained for the entire set of nested transactions.

Hence, it is possible that a further transaction start instruction of the predetermined type is executed in the given thread after the predetermined type of transaction start instruction, with the further transaction start instruction being executed before the predetermined type of transaction end instruction. In this case, in response to the further transaction start instruction, or in response to a subsequent instruction following the further transaction start instruction, the instruction decoder may control the processing circuitry to capture a further lock identifier which identifies a further lock variable for controlling access to at least one further target resource. While in some cases the lock variable identified by the further transaction start instruction or the subsequent instruction could be the same as the already captured lock variable (in this case separate capture of the further lock identifier may not be needed), in other cases the further transaction start instruction or following instruction may specify a different lock variable, and so a further lock identifier may be added to the set of captured lock coded threads. Hence, in response to decoding of the predetermined type of transaction end instruction when more than one lock identifier has been captured for a given thread, the processing circuitry may prevent or defer commitment of the results of the speculatively executed instructions for the given thread when any of the captured lock variables indicates that another thread holds exclusive access to a corresponding set of at least one target resource. Hence, even if there is nesting of transactions in an embodiment where the hardware does not individually track each nested transaction, the checking of the lock identifiers associated with each transaction start instruction of the set of nested transactions can be performed in response to the predetermined type of transaction end instruction (e.g. the transaction end instruction corresponding to the outer transaction of the nested set of transactions).

In some examples the predetermined type of transaction end instruction may simply be any transaction end instruction. However, as mentioned above, in cases of nested transactions the transaction end instructions of inner transactions of the nested set may effectively be ignored and the operations associated with transaction end may be performed in response to the transaction end instruction associated with the outer transaction of the nested set. Therefore, the processing circuitry may maintain a transaction nesting depth value which represents a transaction nesting depth indicative of a number of executed transaction start instructions for a given thread for which the corresponding transaction remains unaborted and uncommitted. For example, the transaction nesting depth may be zero when executing instructions outside any transaction (without any transaction remaining pending), the depth may be one when in the outer transaction, and the depth may be greater than one when inside an inner transaction of a nested set. The predetermined type of transaction end instruction may comprise a transaction end instruction which is executed when the transaction nesting depth value indicates that the transaction nesting depth equals one. This ensures that the checking of the lock variables is triggered by the transaction end instruction associated with the outer transaction of the set. It will be appreciated that the transaction nesting depth value which is maintained by the processing circuitry (e.g. within a register) need not represent the transaction nesting depth explicitly. While in some cases the stored value may simply correspond to the numeric value associated with the transaction nesting depth, in other examples the stored value may encode the nesting depth using some value from which the nesting depth can be determined.

In some examples, all transaction start instructions could be regarded as the predetermined type of transaction start instruction. However, in other examples the predetermined transaction start instruction may be a special type of transaction start instruction which triggers capture of the lock identifier (either itself or on a subsequent instruction). A second type of transaction start instruction may also be provided, in response to which the decoder controls the processing circuitry to perform speculative execution of subsequent instructions while omitting capture of the lock identifier. By providing two forms of transaction start instruction, this enables transactions which do not depend on a lock variable to be distinguished from transactions which do depend on a lock variable, enabling those lock-independent transactions to be processed faster since it is not necessary to defer commitment when reaching the transaction end when another thread holds the lock. The two types of transaction start instruction could be distinguished by their opcode, or by a start type parameter specified in the instruction encoding, or by a mode value stored in a configuration register which controls whether identically-encoded transaction start-instructions behave as the predetermined type or the second type.

The apparatus may have a lock capture storage region for storing one or more lock identifiers captured in response to the one or more transaction start instructions of the given thread. For example the lock capture storage region could comprise a set of internal registers within the transaction memory support circuitry. Those internal registers need not be accessible directly by software, but could be hidden registers used by the hardware alone. In response to decoding of the predetermined type of transaction end instruction, when zero lock identifiers are stored in the lock capture storage region for the given thread, the processing circuitry may determine whether to commit the results of the speculatively executed instructions of the transaction independently of whether a lock variable indicates another thread holds exclusive access to at least one target resource. Hence, the lock capture storage region indicates whether any locks need to be checked at transaction end, and if so which lock variables. If multiple threads are executing transactions concurrently, the lock capture storage region may record corresponding sets of one or more lock identifiers separately for each thread.

The transactional memory support circuitry may take various forms and may include a number of resources which assist with processing of transactions. For example, the transactional memory support circuitry may include speculative result storage circuitry for storing the results of the speculatively executed instructions for at least one transaction of at least one thread. In some cases, multiple sets of speculatively executed results may be stored for transactions running in different threads. It is not essential for all speculative results to be stored in the speculative result storage circuitry. For example, the transactional memory support circuitry may also have restoration state storage circuitry to store state captured in response to the transaction start instruction which is restored on aborting the transaction. Hence, register state or other architectural state values which are restored upon the aborting of the transaction need not be stored in the speculative result storage circuitry since the current values in the architectural registers of the processor may effectively indicate those speculative results (which would be overwritten with the restoration state upon an abort of the transaction). The speculative result storage circuitry could for example store results of store instructions for storing values to memory. By holding the speculative results for store instructions in the speculative result storage circuitry until the transaction is committed, this avoids polluting the memory with data values which may subsequently turn out to be incorrect or may cause other threads to behave incorrectly.

In another example, the transactional memory support circuitry may comprise conflict detection circuitry to detect conflicts between a data access to a given address made within a transaction of a first thread and a data access to the same address made by another thread (either within a transaction or in a non-transactional thread). For example, address tracking circuitry may be provided to track the addresses accessed by instructions within a transaction. The conflict detection circuitry may detect conflict when another thread accesses one of the addresses recorded in the address tracking circuitry. When a conflict is detected, the conflict detection circuitry may trigger an abort of the transaction of the first thread for which the addresses are being tracked.

The transactional memory support circuitry could also have circuitry for detecting other events which may cause aborting of a transaction. For example, on receipt of an interrupt could be aborted. Also a transaction may be aborted if the transactional memory support circuitry runs out of resources (e.g. if the number of speculative results to be stored in the speculative result storage circuitry or a number of addresses tracked by the address tracking circuitry exceeds the capacity available within the storage provided), so that it is no longer possible to guarantee that the transaction will proceed correctly without conflict. Also, certain types of instruction may be inappropriate for being processed within a transaction and on encountering a type of instruction not allowed within a transaction the transaction may be aborted. On aborting a transaction, it may be up to software to determine whether to try to execute the transaction again or to execute an alternative code path using a non-transaction based mechanism such as using locks.

A corresponding computer program may control a host data processing apparatus to provide an instruction execution environment for execution of instructions, in which processing program logic is responsive to the predetermined type of transaction start instruction and predetermined type of transaction end instruction to handle the capture of the lock identifier and the checking of the lock variable as discussed above. Such a computer program may allow a generic host data processing apparatus which does not itself have the transactional memory support circuitry or the instruction decoder support for the predetermined type of transaction start/end instruction to benefit from the transactional memory functionality and the improved handling of cases where the transactions need to check lock variables, even though there may be no actual hardware providing these features. Instead the computer program provides program logic, such as sets of instructions or data structures, which emulate this functionality, enabling the generic host data processing apparatus to execute code intended for execution on an apparatus which does provide such hardware features.

FIG. 1 illustrates an example of a data processing apparatus 2 with hardware transactional memory (HTM) support. The apparatus has processing logic 4 for executing instructions to carry out data processing operations. For example the processing logic 4 may include execution units for executing various types of processing operations, such as an arithmetic/logic unit (ALU) for carrying out arithmetic or logical operations such as add, multiply, AND, OR, etc.; a floating-point unit for performing operations on floating point operands; or a vector processing unit for carrying out vector processing on vector operands comprising multiple data elements. A set of architectural registers 6 is provided for storing operands for the instructions executed by the processing logic 4 and for storing the results of the executed instructions. An instruction decoder 8 decodes instructions fetched from an instruction cache 10 to generate control signals for controlling the processing logic 4 or other elements of the data processing apparatus 2 to perform the relevant operations. A load/store unit 12 is also provided to perform load operations (in response to load instructions decoded by the instruction decoder 8) to load a data value from a data cache 14 or main memory 16 into the architectural registers 6, and store operations (in response to store instructions decoded by the instruction decoder 8) to store a data value from the architectural registers 6 to the data cache 14 or memory 16.

The apparatus 2 also has transactional memory support circuitry 20 which provides various resources for supporting hardware transactional memory (HTM). The HTM resources in the transactional memory support circuitry 20 may include for example speculative result storage 22 for storing speculative results of transactions, address tracking circuitry 24 for tracking the addresses accessed by a transaction, conflict detection circuitry 26 for detecting conflicts between data accesses made by a transaction and data accesses made by other threads, so that a transaction can be aborted when a conflict is detected, and restoration state storage circuitry 28 for storing a snapshot of the architectural state data from the architectural registers 6 at the start of a transaction, so that this state can be restored to overwrite the speculative results of the transaction when a transaction is aborted. Also, the resources may include a lock storage structure 30 for strong lock identifiers and a nesting depth register 32 for storing a nesting depth value tracking a level of nesting of transactions, which will be described in more detail later.

Figures 2, 3:
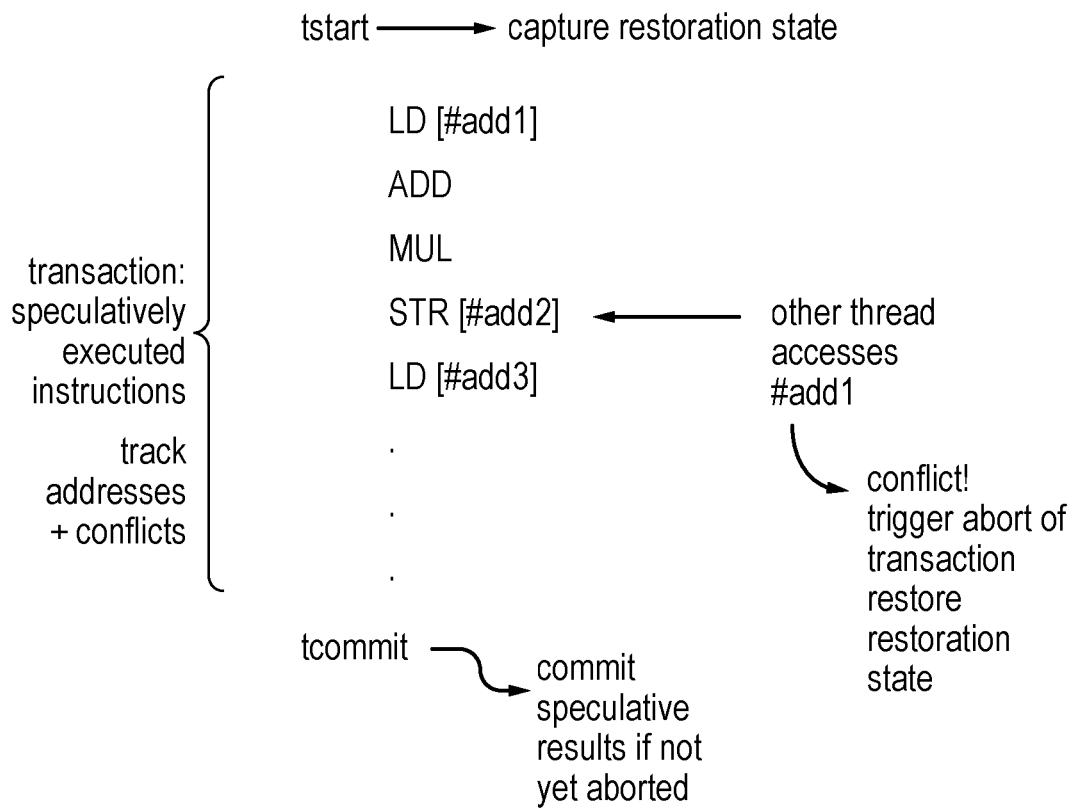
FIG. 2 illustrates an example of processing of a transaction in a system with transactional memory support.
FIG. 3 shows an alternative code sequence for executing equivalent operations to the transaction of FIG. 2 in a lock-based mode.

FIG. 2 shows an example of executing a transaction within a given thread using the transactional memory support circuitry 20 and the processing logic 4. A transaction is a section of program code which is bounded by a transaction start instruction (tstart) and a transaction end instruction (tcommit). As shown in FIG. 2, in response to the transaction start instruction the current architectural state in the architectural registers 6 is captured and stored in the restoration state storage circuitry 28. The processing logic 4 begins to perform speculative execution of the subsequent instructions following the tstart instruction, and as these instructions are executed, the addresses accessed by those instructions are tracked by the address tracking circuitry 24, and the conflict detection circuitry 26 detects conflicts between the tracked addresses and addresses of made accesses using the load/store unit 12 in response to other threads. At least some speculative results of the instructions within the transaction are stored within the speculative result storage circuitry 22. For example the value stored the cache or to memory in response to a store instruction STR may be held in the speculative result storage 22 while the transaction remains pending. If the transaction end instruction (tcommit) is reached without an abort event occurring in the meantime, then in response to the transaction end instruction the speculative results are committed. On committing the transaction, any results stored in the speculative results storage 22 for that thread may be written to the data cache 14 or memory 16 and the restoration state 28 can be discarded or permitted to be overwritten as it is no longer needed to rewind architectural state to the point before the transaction start instruction was encountered.

On the other hand, if an abort event occurs, for example when a conflict is detected by the conflict detection circuitry 26 when another thread accesses an address already accessed by the transaction, then an abort of the transaction is triggered and the restoration state from the restoration state storage 28 is restored to the architectural registers 6. Other causes of an abort event could for example include execution of an instruction which is not allowed to be executed within a transaction, insufficient resource within the speculative result storage 22 or an address tracking circuitry 24 for handling the speculative results or addresses required by a given transaction, or an interrupt being received during the transaction.

FIG. 2 shows how a certain set of processing operations to be performed may be performed in a transactional mode using the transaction start and end instructions. As shown in FIG. 3, the same set of processing operations can also be performed in a non-transactional mode using a lock-based mechanism. In this case, before starting the section of code, at least one lock checking instruction 40 checks a lock variable identified by a locking address #addLock and checks whether the lock variable indicates that another thread already holds the lock. If another thread holds the lock, then the processing does not progress beyond the lock checking instruction 40 until the lock is released. Once the lock is determined to be available then the lock is claimed by writing a given value (e.g. binary 1) to the lock address #addLock. For example, the lock checking instruction 40 could be implemented using an atomic compare and swap instruction which compares the current value stored at the specified address to determine whether the lock is held, and updates the lock variable to claim the lock if the lock is unclaimed. Alternatively the lock checking could be implemented with a series of multiple instructions to read the lock, test the value of the lock and either cause the processing to be deferred if the lock is already claimed, or claim the lock by updating the lock variable if the lock is currently unclaimed. Having completed the section of code guarded by the lock, another instruction 42 may release the lock once exclusive access to the resource guarded by the lock is no longer required. For example the resource guarded by the lock may be the data locations identified by various addresses which are accessed during the intervening section of code.

Hence, some threads of processing being executed by the processing logic 4 may use the transaction mode as shown in FIG. 2 while other threads may use the lock-based mode which will does not use transactions. Also, threads which were initially attempted using the transactional mode may, if frequent aborts occur for those transactions, switch to using a non-transactional mode using locks. For example, there may be a set of threads which keep encountering conflicts, and so it is not efficient to continue to use transactions for all of those threads. Hence, even while one thread is using a transactional mode similar to the one shown in FIG. 2, there may still be other threads which need to use a lock-based mechanism. Also, the threads which operate in the transactional modes may still need to access the shared resources which are also accessed by the non-transactional threads. In some cases, the non-transactional threads may actually be executing the same code as the transactional threads, but the code may have both transactional and non-transactional paths within the code, which may be selected depending on whether the transactions have been found to be efficient on previous occasions (for example the software may switch to a non-transactional path if the transactional path keeps aborting).

Figure 4:
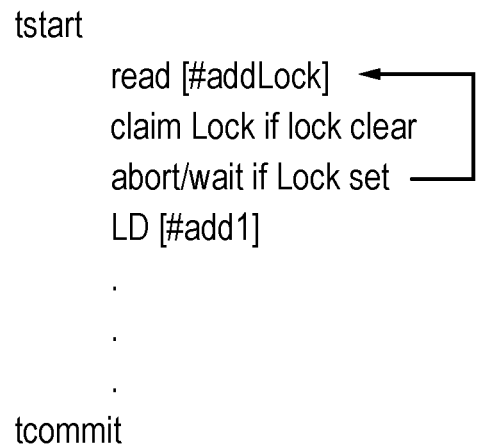
FIG. 4 illustrates an example of a transaction provided with instructions for checking a lock variable to protect non-transactional threads against interference from a transactional thread.

As there may be both transactional and non-transactional threads which need to share access to a resource guarded by a lock, then as shown in FIG. 4 sometimes a transactional thread may still need to have some instructions which read the lock address, claim the lock if the lock is clear, and abort the transaction or wait for a period of time if the lock is currently claimed or set. While such lock checking instructions would not be required to ensure the correct processing of the transactional thread itself, since the conflict checking circuitry 26 will be able to detect if another thread operation conflicts with the transaction and if so to abort the transaction to prevent incorrect results, the lock checking would be required to prevent committing of results of a transaction at a time when another thread holds the lock, which could comprise the operation of a non-transactional thread.

Figure 5:
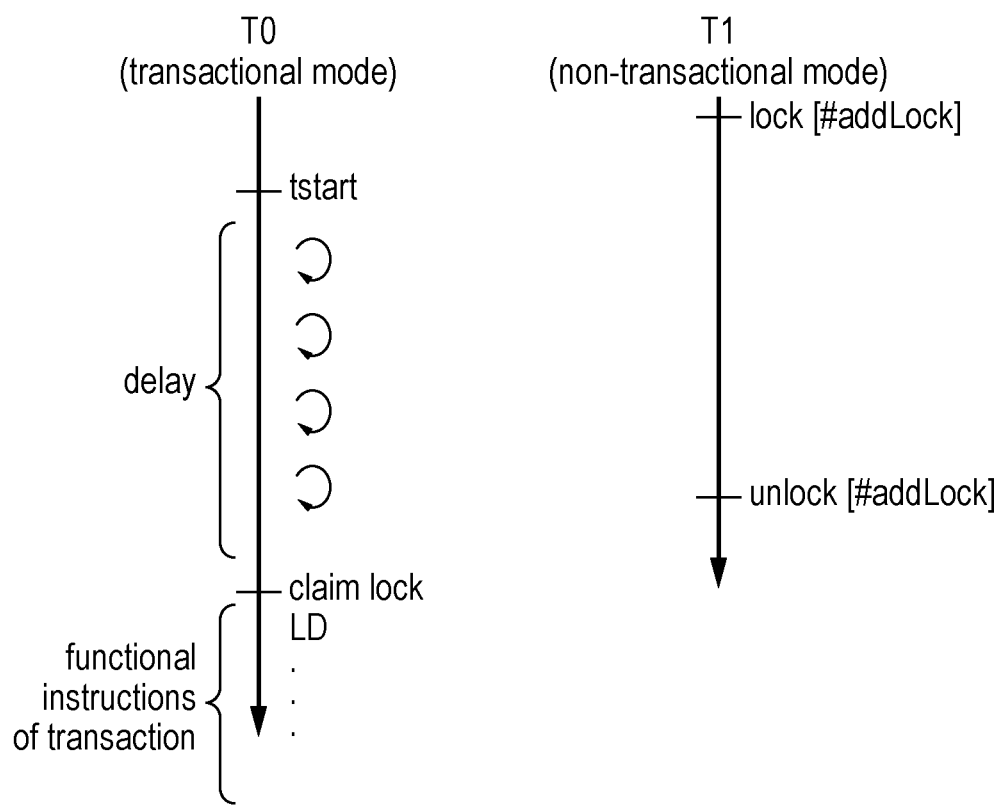
FIG. 5 illustrates a problem where the processing of a transactional thread may be delayed when a non-transactional thread holds exclusive access to a locked resource.

Therefore, as shown in FIG. 5 it is common for transactional and non-transactional threads when coexisting to encounter a situation where the non-transactional thread T1 has claimed a lock before the start of a transaction in a transactional thread T0. On entering the transaction, the transactional thread T0, may execute some instructions as shown in FIG. 4 to check whether the lock identified by the lock address #addLock is held, and may delay the subsequent processing of the functional instructions of the transaction until the lock can be claimed by the transactional thread T0. As this may take some time, since the non-transactional thread T1 may not unlock the lock for a number of cycles, this incurs a delay as shown in FIG. 5.

Figure 6:
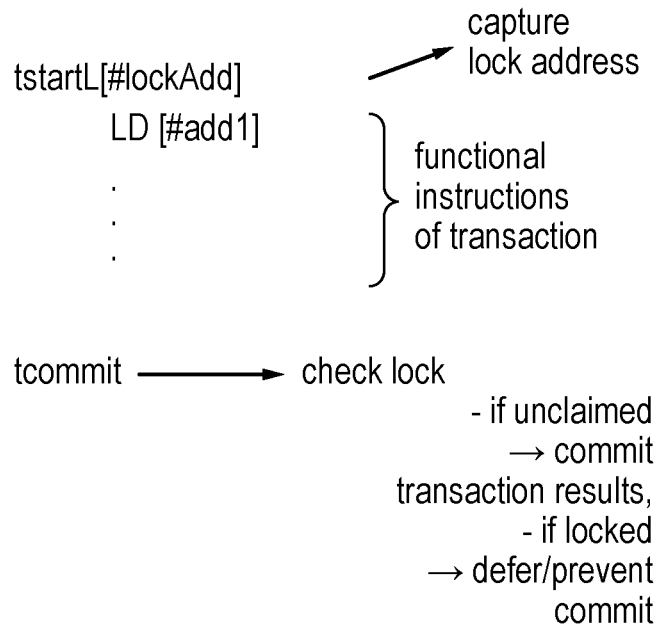
FIG. 6 shows an approach for avoiding this delay by capturing a lock identifier in response to a predetermined type of transaction start instruction and checking the lock variable identified by the lock identifier in response to a transaction end instruction.

FIG. 6 shows an alternative way of handling lock checking in a transaction which can help to avoid such a delay. A predetermined type of transaction start instruction, tstartL, is provided which a specifies a lock address, e.g. using an immediate value or a register reference. In response to the predetermined type of transaction start instruction, the lock address is captured within the lock storage structure 30 shown in FIG. 1. For example the lock storage structure 30 may comprise one or more registers to which the addresses of lock variables can be written. Having captured the lock address and performed any other operations which are associated with the conventional transaction start instruction, the functional instructions of the transaction can be executed and there is no need to include any instructions for checking the lock variable and deferring processing of the transaction if the lock is currently held. Hence this eliminates the delay shown in FIG. 5. Instead the checking of a lock variable is deferred until the transaction end instruction, tcommit, is reached. In response to the transaction end instruction, the processing logic 4 is controlled by the instruction decoder 8 to check the lock variable indicated by any lock address which is captured within the lock storage structure 30. In some cases, this checking could be delegated to a lock checking engine 34 as shown in FIG. 1, which may have an associated timer 36 which controls the lock checking engine 34, when activated by the transaction end instruction tcommit, to periodically issue a load operation to read the lock variable identified by the lock address stored in the lock storage structure 30 and check whether the lock variable currently indicates that the lock is held by another thread, and to continue checking until that lock is no longer held by another thread. Hence, if currently locked, committing of the results generated by the speculatively executed instructions of the transaction is deferred or prevented. On the other hand, when the lock is found to be unclaimed then the transaction's results can be committed. The lock checking circuitry 34 is not essential and instead such checking of the locks could be handled by the processing logic 4 or the load store unit 12.

Figure 7:
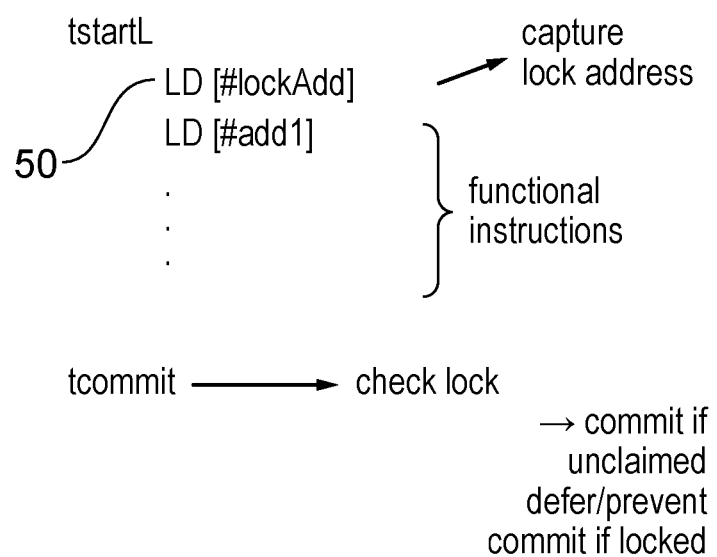
FIG. 7 shows an alternative where the lock variable is captured in response to the first load instruction after the predetermined type of transaction start instruction.

FIG. 7 shows an alternative way of implementing the predetermined type of transaction start instruction tstartL. In this case, the tstartL instruction itself does not specify the lock identifier address, but instead the lock identifier address is obtained from the first load instruction 50 which follows the predetermined type of transaction start instruction, and then the load address is captured in the same way as FIG. 6. The operation of a transaction end instruction in FIG. 7 is the same as in FIG. 6.

The predetermined type of transaction start instruction tstartL shown in FIGS. 6 and 7 can be distinguished from a conventional type of transaction start instruction tstart as shown in FIG. 4 in a variety of ways. In some cases, the different types of transaction start instructions could have different instruction opcodes. Alternatively they can share a same opcode but there could be a parameter specified within another field of the instruction encoding which distinguishes the normal transaction start instruction which does not trigger capture or lock address from the special type of transaction start shown in FIGS. 6 and 7 which does trigger the lock capture. Alternatively a mode bit within a status register in the architectural registers 6 could govern whether a transaction start instruction should trigger capture of a lock address. In implementations such as FIG. 7 where the transaction start instruction does not itself trigger the capture of the lock address, a flag within one of the registers 6 may be set to a first value in response to the predetermined type of transaction start instruction tstartL so that when a load instruction 50 is encountered, then the lock address is captured if the status flag has a first value and is not captured if the status flag has a second value. When the lock address is captured, the flag may be set to the second value, so that a subsequent load does not trigger capture of a further address. With this approach, the compiler or programmer is required to ensure that the first load instruction executed after the predetermined transaction start instruction is the one that provides the address of the lock variable (in practice it is likely that lock checking would be the first operation performed in a transaction anyway as the transaction start instruction would normally be included at the start of the critical section of code which requires the lock).

Figure 8:
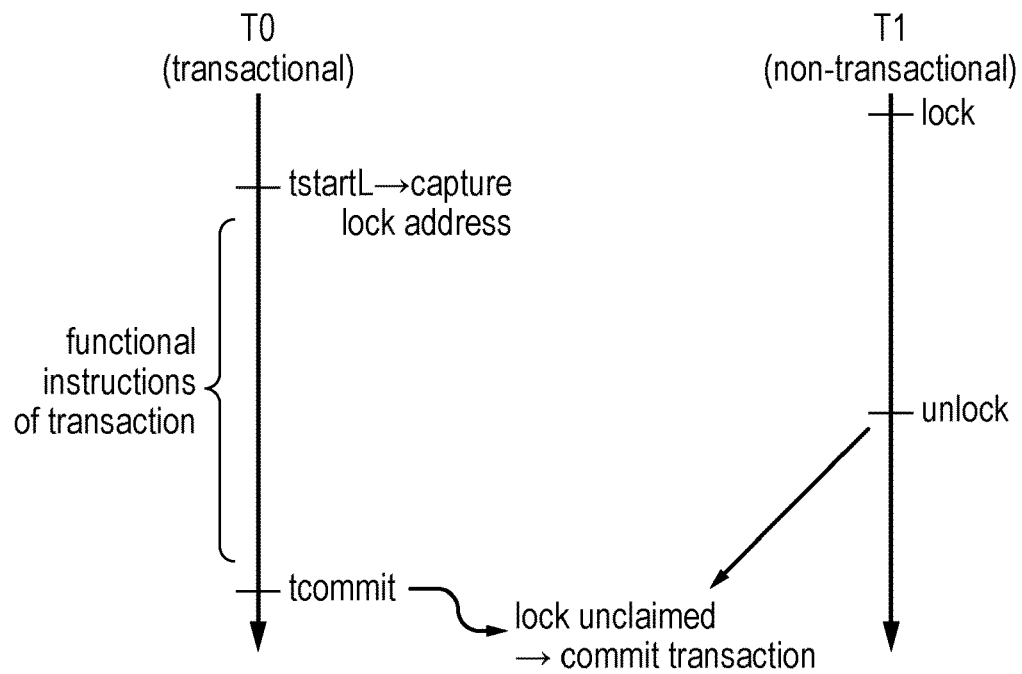
FIG. 8 shows an example of processing of transactional and non-transactional threads where the lock is unclaimed at the end of the transaction in the transactional thread.

As shown in FIG. 8, with the approach shown in FIGS. 6 and 7 this allows the delay of FIG. 5 to be eliminated even when there is a non-transactional thread which holds the lock. The lock address is captured following the predetermined type of transaction start instruction of the transactional thread T0, to provide an indication that the lock variable will need to be checked when the transaction end is reached. It does not matter at this point whether the lock is actually held by another thread, and the functional instructions of the transaction can continue to be executed speculatively. At the transaction end, the tcommit instruction triggers checking of the lock variable, and in the situation shown in FIG. 8 it is found that the lock is currently unclaimed since the non-transactional thread T1 has already unlocked the lock variable. Therefore, the results of the transaction in the transactional thread T0 can be committed. In contrast, with the approach discussed earlier, if the lock was held by the non-transactional thread at the start of the transaction in the transactional thread T0, a delay would have been incurred. By checking the lock variable at the end of the transaction instead of the beginning, it is more likely that the non-transactional thread has unlocked the lock variable before the transaction end.

Figure 9:
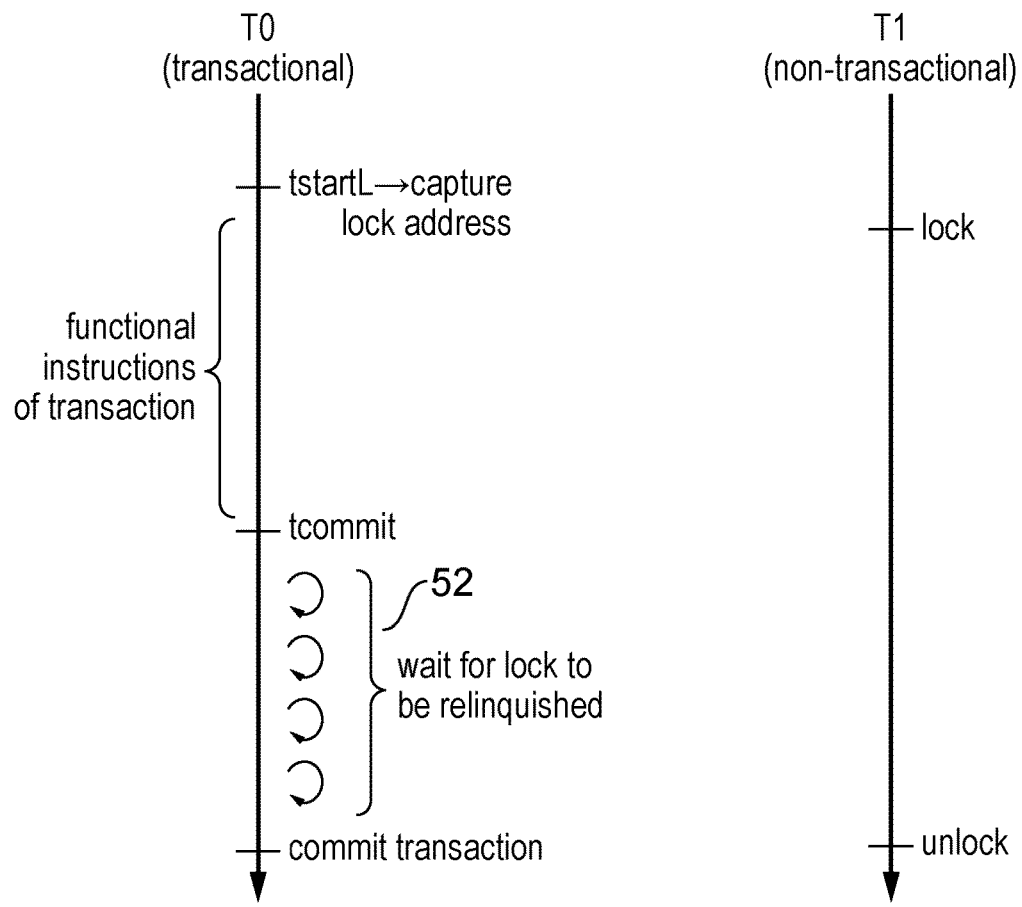
FIG. 9 shows an example where the lock is held by the non-transactional thread at the end of the transactional threads transaction.

As shown in FIG. 9, even if the lock is still held by the other thread T1 at the point when the transaction end instruction tcommit is reached, the delay 52 associated with waiting for the lock to be relinquished is likely to be less than the delay which would have been incurred if the approach shown in FIG. 5 was used and the lock was checked at the beginning of the transaction, since some of the time spent waiting for the lock to be released has been used to execute the functional instructions of the transaction. Hence this may still improve performance relative to the case shown in FIG. 5.

Figure 10:
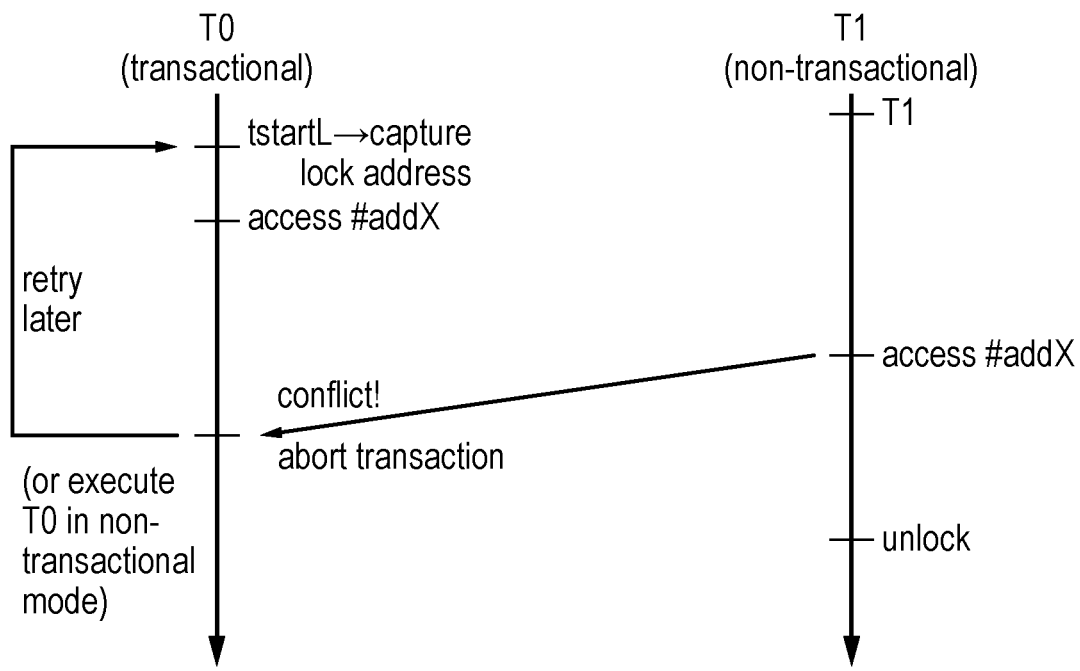
FIG. 10 is an example illustrating how conflicts between transactional and non-transactional threads may abort the transaction.

As shown in FIG. 10, if there is a conflict between the addresses accessed by the respective transactional and non-transactional threads T0, T1 then this will be detected by the conflict detection circuitry 26 and the transaction may be aborted and retried later or alternatively executed in the non-transactional mode. Hence, it is not a problem that the instructions of the transaction are allowed to proceed even if the lock is held by the non-transactional thread T1. The checking of the lock is not required in order to ensure correct processing of the transactional thread T0. Also, even if the non-transactional thread T1 tries to claim the lock after the transaction has already started (and thread T1 may successfully claim the lock, as the transaction in thread T0 does not attempt to claim the lock even if the lock address is captured in the lock storage structure 30), address conflicts will still trigger aborting the transaction, and if no abort occurs but thread T1 still holds the lock when T0 reaches the end of the transaction, the transaction commit is deferred/prevented.

When a lock address is allocated to the lock storage 30, that lock address does not need to be tracked by the address tracking circuitry 24, so accesses to that address by other threads do not trigger detected conflicts. This enables writes to a lock variable by other threads without suspending the transaction, as an abort is not needed because the lock will be checked at the transaction end.

Figure 11:
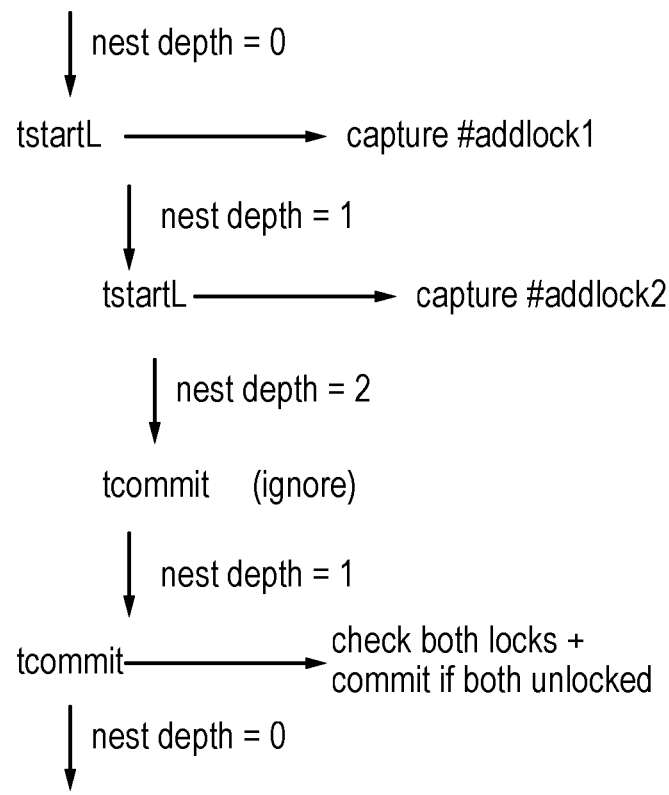
FIG. 11 shows an example of handling nested transactions.

As shown in FIG. 11, it is possible for transactions to be nested so that a further transaction start instruction is received before the transaction end instruction corresponding to a previous transaction start instruction has been encountered, and while the earlier transaction is still pending and has not been aborted. The nesting depth register 32 may track the current nesting depth of transactions to distinguish cases when no transactions have been started, when just a single transaction has been started, or when a further nested transaction has been started within a previous transaction. As shown in FIG. 11, when no transactions have yet been started the nesting depth may be 0. In response to the first transaction start instruction, the nesting depth may be incremented to 1. If a further nested transaction is started then the nesting depth may be incremented again to 2, and so on. On committing a transaction, the nesting depth may be decremented. Hence, as each respective nested transaction commits, the nesting depth is gradually unwound until all the transactions have committed and the nesting depth is back to 0 again.

In practice, it may not be worth maintains separate sets of restoration state for each nested transaction. Instead, the hardware may effectively ignore any nested transactions and simply treat them as part of a larger outer transaction of the nested set. Nevertheless, the code may have defined nested transactions in order to ensure that even if code branches to a part of the program code after the outer transaction start instruction, the section of code following the branch point will still be treated as a transaction. Hence, in some cases the HTM resources 20 may effectively ignore transaction start and end instructions for the inner transactions of the set (i.e. transactions for which the transaction start instruction is executed when the nesting depth is already 1 or greater). Hence, the transaction end instruction tcommit of the outer transaction (executed when the nesting depth is 1) triggers committing of state and discarding of restoration state, while transaction end instructions tcommit of inner transactions would be ignored (when the nesting depth is 2 or more). Note that the nesting depth need not be represented explicitly within the nesting depth register 32 and there may be other ways of representing a nesting depth other than a binary value indicating the actual nesting depth number (e.g. a status code could represent the nesting depth).

Hence, when providing the lock capture function as discussed above, each transaction start instruction of a nested set may lead to the capture of a separate lock variable. In some cases the lock identifier associated with a second transaction start instruction may be the same as an already captured lock identifier, and in this case the lock storage structure 30 need not allocate a separate entry for the same lock identifier. However, if the lock identifier is different to an already captured lock identifier then a second lock identifier is allocated to the lock storage structure 30. For the transaction end instructions tcommit associated with transactions which are inner transactions in the nested set, no action is performed. However, for the outer transaction end instruction (when the nesting depth is 1) then the one, two or more lock identifiers stored in the lock storage structure are checked to see whether any of the corresponding lock variables indicate that a lock is held by another thread, and the results of the transaction (including any inner transactions) are committed if all of the locks indicated in the lock storage structure 30 for the current thread are currently free. Again, this mechanism may enable performance improvement by deferring the lock checking until the end of the set of nested transactions, enabling forward progress in the transactions even if the lock is held at the beginning of the transaction.

Figure 12:
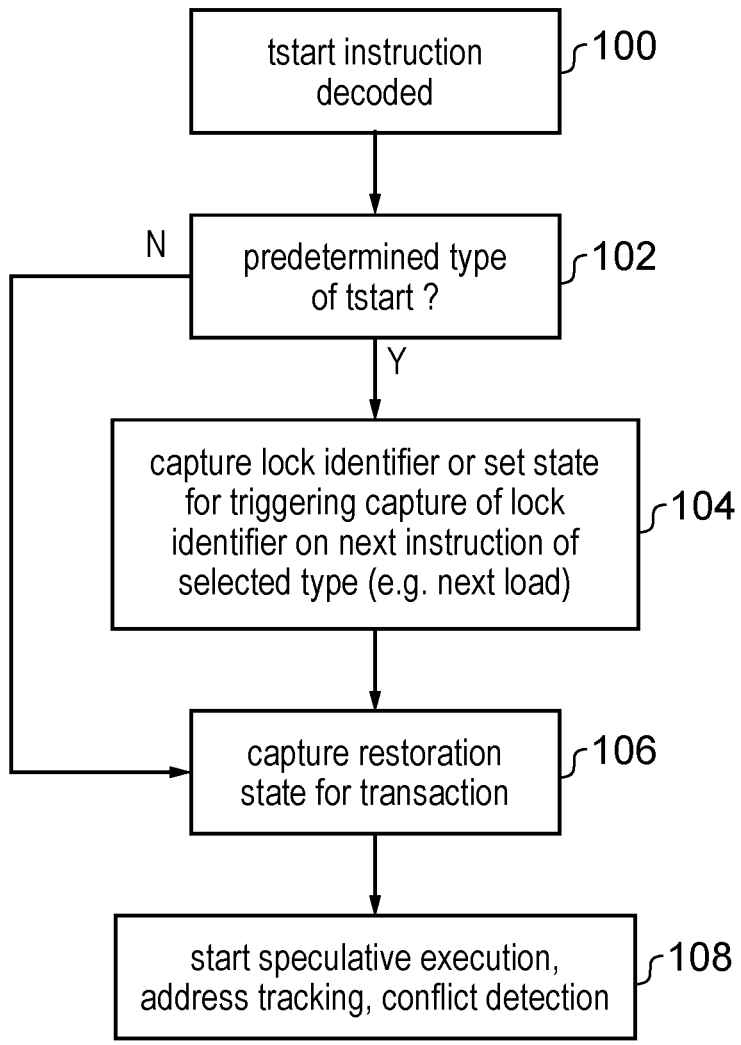
FIG. 12 is a flow diagram illustrating processing of a transaction start instruction.

FIG. 12 is a flow diagram illustrating processing of a transaction start instruction. At step 100 a transaction start instruction is decoded by the instruction decoder 8. At step 102 the decoder determines whether the transaction start instruction is the predetermined type of transaction start instruction. If so, then at step 104 the instruction decoder 8 generates control signals which trigger the processing logic 4 to capture a lock identifier in the lock storage structure 30, or to set state for triggering capture of the lock identifier in response the next instruction of the selected type (e.g. the next load instruction). If the transaction start instruction was not of the predetermined type, then step 104 is omitted.

Regardless of the type of transaction start instruction, at step 106 the control signals generated by the instruction decoder 8 also control the processing logic 4 to capture a set of restoration state for the transaction by writing the current values stored within the architectural registers 6 to the restoration state storage. In some cases the restoration state storage 28 may include two or more different sets of restoration state corresponding to multiple threads, and so the captured restoration state may be allocated to a region not already allocated to handling restoration state for a different thread. At step 108, in response to subsequent instructions to the transaction start instruction, the instruction decoder 8 generates control signals to control the processing logic 4 to start speculative execution of those instructions. The address tracking circuitry 24 starts tracking addresses accessed by the subsequent speculatively executed instructions, and the conflict detection circuitry 26 starts checking for conflicts between the addresses tracked in the address tracking circuitry 24 and addresses accessed by other threads.

Figure 13:
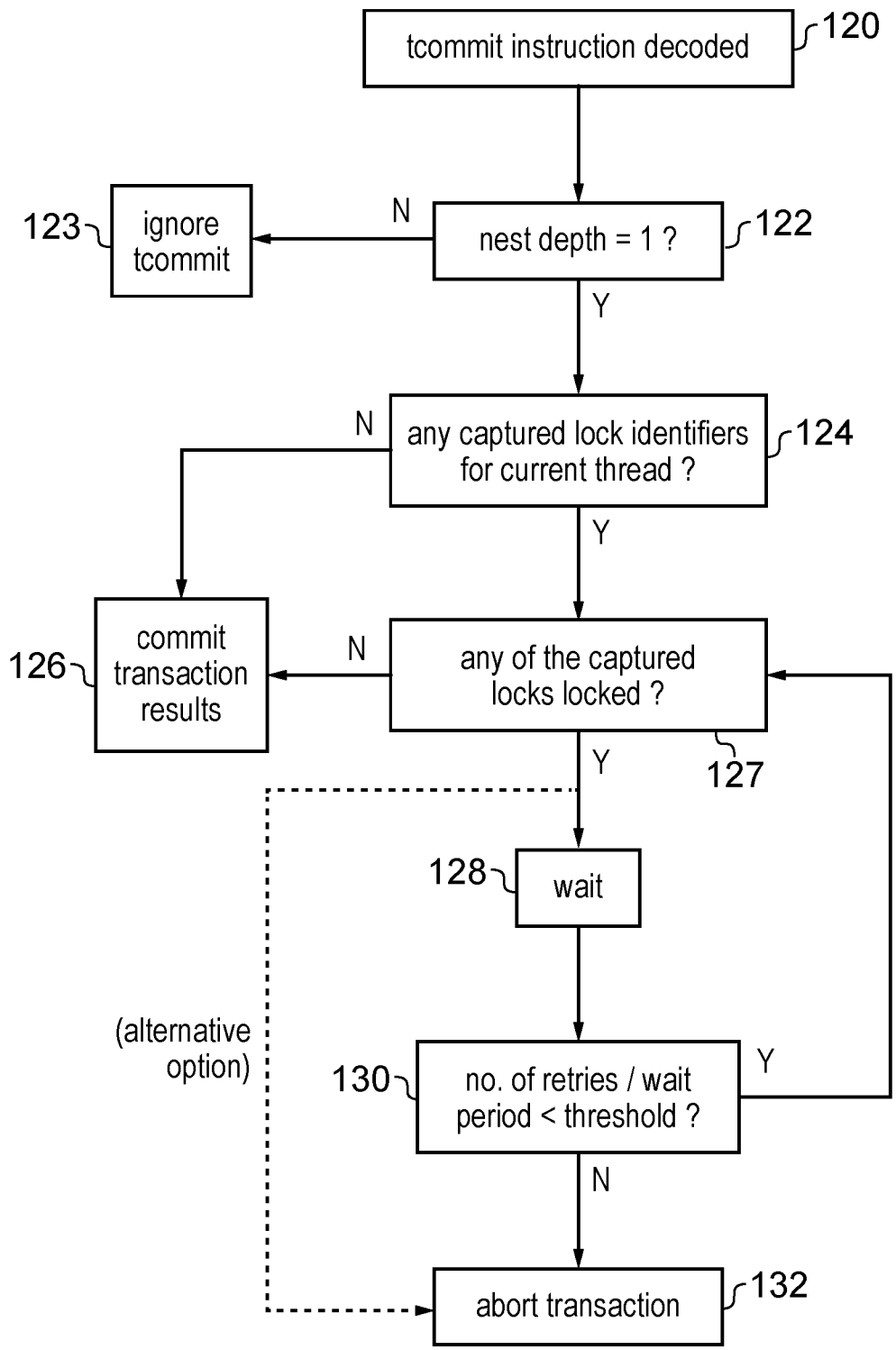
FIG. 13 is a flow diagram illustrating processing of a transaction end instruction.

FIG. 13 is a flow diagram illustrating processing of a transaction end instruction. At step 120 a transaction end instruction is decoded by the instruction decoder 8 to generate control signals for controlling the processing logic 4 to perform the subsequent steps of FIG. 13. At step 122, the nesting depth register 32 is checked to determine whether the nesting depth equals 1. If not then the current transaction is an inner transaction of a nested set, and at step 123 the transaction end instruction is ignored. If the nesting depth is 1, then the transaction end instruction is acted upon and at step 124 the processing logic 4 determines whether there are any captured lock identifiers stored in the lock storage structure 30 for the current thread. If not, then no lock needs to be checked (e.g. the original transaction start instruction may not have been of the predetermined type), and so at step 126 the results generated speculatively in the transaction are committed. Hence, any results stored in the speculative result storage circuitry 22 may be written to the data cache 14 or memory 16. Also, any speculative value stored in the architectural register 6 becomes non-speculative (no changes are required to ensure this, instead the results become non-speculative because they can no longer be overwritten by restoration state). Any restoration state associated with the current transaction in the restoration state storage 28 can be discarded or made available for overwriting by restoration state associated with a later transaction.

If any captured lock identifiers were present within the lock storage structure 30 at step 124, then at step 127 the processing logic 4 or the lock checking engine 34 checks whether any of the captured locks are currently locked. If not then again at step 126 the transaction results can be committed. If at step 127 it is determined that any of the captured lock identifiers for the current thread refer to a lock variable which indicates that the corresponding resource is locked by another thread, then at step 128 the processing logic 4 or the lock checking engine 34 waits for a period to defer committing of the results of the transaction. After waiting for a period then at step 130 it is determined whether a number of retries or a period spent waiting is less than a threshold, and if so then at step 127 another attempt is made to check whether any of the captured locks are currently locked, and if all of the locks are unlocked then the transaction's results can now be committed 126. Otherwise the system continues to wait. If at step 130 the number of retries or the wait period reaches the threshold, then at step 132 the transaction can be aborted. Alternatively, rather than implementing the wait mechanism, it may be simpler to simply abort the transaction by proceeding directly to step 132 if any of the captured locks are determined to be locked at step 127. If the transaction is aborted, software may determine whether to reschedule the transaction later or to attempt to execute the transaction using a lock-based non-transactional mode.

Figure 14:
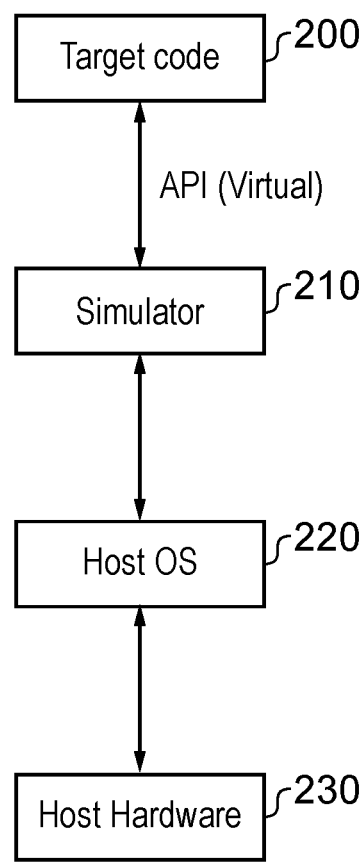
FIG. 14 illustrates a simulator embodiment that can be used.

FIG. 14 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium (which may be a non-transitory medium), and provides a program interface (instruction execution environment) to the target code 200 (which may include applications, operating systems and a hypervisor) which is the same as the application program interface of the hardware architecture being modeled by the simulator program 210. Thus, the program instructions of the target code 200, including the predetermined type of transaction start/end instruction described above, may be executed from within the instruction execution environment using the simulator program 210, so that a host computer 230 which does not actually have the hardware features of the apparatus 2 discussed above can emulate these features.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
    an instruction decoder to decode instructions;
    processing circuitry to perform data processing in response to the instructions decoded by the instruction decoder, the processing circuitry comprising transactional memory support circuitry to support execution of a transaction within a thread of data processing by the processing circuitry, the transaction comprising instructions of the thread executed speculatively between a transaction start instruction and a transaction end instruction, for which the processing circuitry is configured to prevent commitment of results of the speculatively executed instructions until the transaction end instruction is reached; and
    wherein in response to a predetermined type of transaction start instruction of a given thread or a subsequent instruction following said predetermined type of transaction start instruction in said given thread, the instruction decoder is configured to control the processing circuitry to capture a lock identifier identifying a lock variable for controlling exclusive access to at least one target resource; and
    in response to a predetermined type of transaction end instruction of the given thread executed following said predetermined type of transaction start instruction, the instruction decoder is configured to control the processing circuitry to check the lock variable identified by the captured lock identifier, and to prevent or defer commitment of the results of the speculatively executed instructions for the given thread when the lock variable indicates that another thread holds exclusive access to said at least one target resource;
    wherein the transactional memory support circuitry comprises at least one of:
        speculative result storage circuitry to store said results of the speculatively executed instructions for at least one transaction of at least one thread;
        restoration state storage circuitry to store state captured in response to the transaction start instruction to be restored on aborting the transaction;
        conflict detection circuitry to detect a conflict between a data access to a given address made within a transaction of a first thread and a data access to the same address made by another thread; and
        address tracking circuitry to track addresses accessed by instructions within a transaction.

2. The apparatus according to claim 1, wherein the lock identifier comprises an address of a storage location storing the lock variable.

3. The apparatus according to claim 1, wherein the instruction decoder is configured to control the processing circuitry to capture the lock identifier in response to the predetermined type of transaction start instruction.

4. The apparatus according to claim 3, wherein the predetermined type of transaction start instruction has an encoding specifying the lock identifier or specifying a register storing the lock identifier.

5. The apparatus according to claim 3, wherein in response to the predetermined type of transaction start instruction, the instruction decoder is configured to control the processing circuitry to read the lock identifier from a predetermined register.

6. The apparatus according to claim 1, wherein the instruction decoder is configured to control the processing circuitry to capture the lock identifier in response to a first instruction of a selected type following the predetermined type of transaction start instruction in the given thread.

7. The apparatus according to claim 6, wherein said instruction of the selected type comprises a load instruction for loading a data value from a storage location to a register.

8. The apparatus according to claim 7, wherein the load instruction specifies a target address identifying said storage location from which the data value is to be loaded; and
the lock identifier comprises the target address of the first load instruction of the given thread following the predetermined type of transaction start instruction.

9. The apparatus according to claim 1, wherein in response to decoding of said predetermined type of transaction end instruction, the processing circuitry is configured to abort the transaction of the given thread when the lock variable indicates that another thread holds exclusive access to said at least one target resource.

10. The apparatus according to claim 1, wherein in response to decoding of said predetermined type of transaction end instruction, the processing circuitry is configured to defer commitment of the results of the speculatively executed instructions for the given thread until the lock variable indicates that the other thread has relinquished exclusive access to said at least one target resource.

11. The apparatus according to claim 10, wherein in response to decoding of said predetermined type of transaction end instruction, the processing circuitry is configured to abort the transaction of the given thread when a number of attempts to check the lock variable or a waiting latency associated with waiting for exclusive access to said at least one target resource to be relinquished by the other thread exceeds a predetermined threshold.

12. The apparatus according to claim 1, wherein in response to a further transaction start instruction of the predetermined type executed in the given thread after the predetermined type of transaction start instruction and before the predetermined type of transaction end instruction, or in response to a subsequent instruction following said further transaction start instruction, the instruction decoder is configured to control the processing circuitry to capture a further lock identifier identifying a further lock variable for controlling access to at least one further target resource.

13. The apparatus according to claim 1, wherein in response to decoding of the predetermined type of transaction end instruction when a plurality of lock identifiers have been captured for the given thread, the processing circuitry is configured to prevent or defer commitment of the results of the speculatively executed instructions for the given thread when any of said plurality of lock variables indicate that another thread holds exclusive access to at least one target resource.

14. The apparatus according to claim 1, wherein the processing circuitry is configured to maintain a transaction nesting depth value representing a transaction nesting depth indicative of a number of executed transaction start instructions of a given thread for which the corresponding transaction remains unaborted and uncommitted; and
said predetermined type of transaction end instruction comprises a transaction end instruction executed when the transaction nesting depth value indicates that the transaction nesting depth equals 1.

15. The apparatus according to claim 1, wherein in response to a second type of transaction start instruction, the instruction decoder is configured to control the processing circuitry to perform speculative execution of subsequent instructions and omit capture of the lock identifier.

16. The apparatus according to claim 1, comprising a lock capture storage region to store one or more lock identifiers captured in response to one or more transaction start instructions of the given thread.

17. The apparatus according to claim 16, wherein in response to decoding of the predetermined type of transaction end instruction, when zero lock identifiers are stored in the lock capture storage region for the given thread, the processing circuitry is configured to determine whether to commit the results of the speculatively executed instructions for the given thread independently of whether a lock variable indicates that another thread holds exclusive access to at least one target resource.

18. An apparatus comprising:
an instruction decoder to decode instructions;
processing circuitry to perform data processing in response to the instructions decoded by the instruction decoder, the processing circuitry comprising transactional memory support circuitry to support execution of a transaction within a thread of data processing by the processing circuitry, the transaction comprising instructions of the thread executed speculatively between a transaction start instruction and a transaction end instruction, for which the processing circuitry is configured to prevent commitment of results of the speculatively executed instructions until the transaction end instruction is reached; and
wherein in response to a subsequent instruction following a predetermined type of transaction start instruction in said given thread, the instruction decoder is configured to control the processing circuitry to capture a lock identifier identifying a lock variable for controlling exclusive access to at least one target resource; and
in response to a predetermined type of transaction end instruction of the given thread executed following said predetermined type of transaction start instruction, the instruction decoder is configured to control the processing circuitry to check the lock variable identified by the captured lock identifier, and to prevent or defer commitment of the results of the speculatively executed instructions for the given thread when the lock variable indicates that another thread holds exclusive access to said at least one target resource;
wherein the instruction decoder is configured to control the processing circuitry to capture the lock identifier in response to a first instruction of a selected type following the predetermined type of transaction start instruction in the given thread.

19. The apparatus according to claim 18, wherein said instruction of the selected type comprises a load instruction for loading a data value from a storage location to a register;
the transactional memory support circuitry comprises address tracking circuitry to track addresses accessed by instructions within a transaction, and conflict detection circuitry to detect a conflict when another thread accesses one of the addresses tracked by the address tracking circuitry; and capture of the lock identifier in response to the subsequent instruction does not cause an address of a storage location storing the lock variable to be tracked by the address tracking circuitry.

20. An apparatus comprising:

an instruction decoder to decode instructions;

processing circuitry to perform data processing in response to the instructions decoded by the instruction decoder, the processing circuitry comprising transactional memory support circuitry to support execution of a transaction within a thread of data processing by the processing circuitry, the transaction comprising instructions of the thread executed speculatively between a transaction start instruction and a transaction end instruction, for which the processing circuitry is configured to prevent commitment of results of the speculatively executed instructions until the transaction end instruction is reached; and wherein in response to a predetermined type of transaction start instruction of a given thread or a subsequent instruction following said predetermined type of transaction start instruction in said given thread, the instruction decoder is configured to control the processing circuitry to capture a lock identifier identifying a lock variable for controlling exclusive access to at least one target resource; and in response to a predetermined type of transaction end instruction of the given thread executed following said predetermined type of transaction start instruction, the instruction decoder is configured to control the processing circuitry to check the lock variable identified by the captured lock identifier, and to prevent or defer commitment of the results of the speculatively executed instructions for the given thread when the lock variable indicates that another thread holds exclusive access to said at least one target resource;

wherein in response to decoding of said predetermined type of transaction end instruction, the processing circuitry is configured to abort the transaction of the given thread when the lock variable indicates that another thread holds exclusive access to said at least one target resource.

* * * * *